March 31, 1953 W. G. STIERITZ 2,633,550
MULTICATHODE GASEOUS DISCHARGE DEVICE
Filed Feb. 3, 1951 5 Sheets-Sheet 1
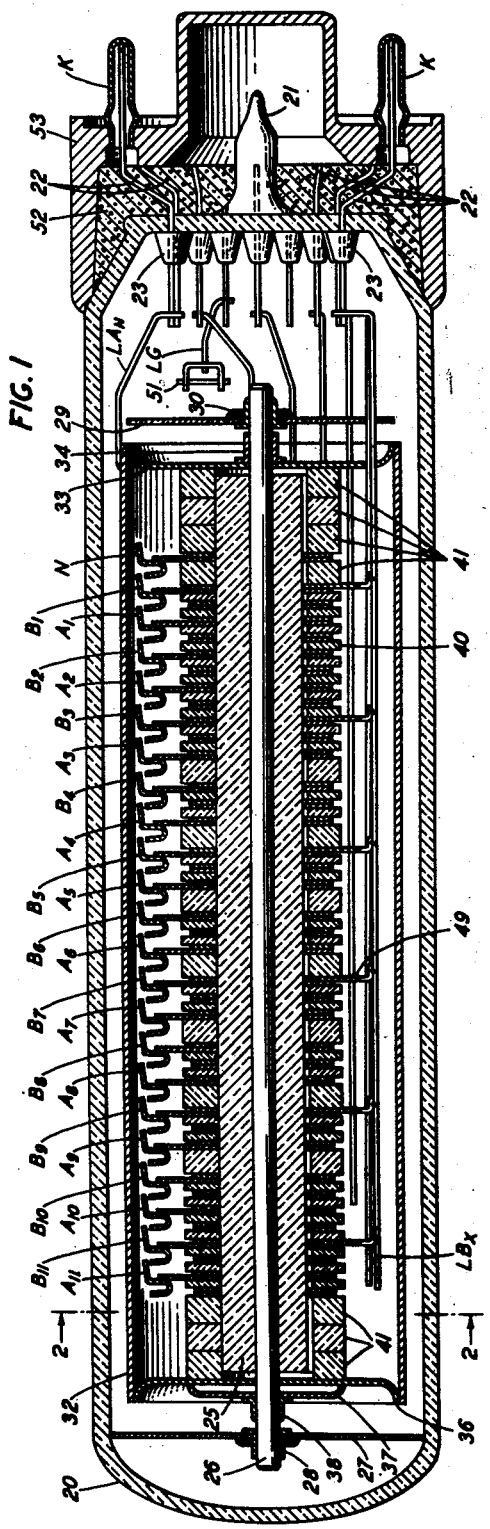
FIG. 1
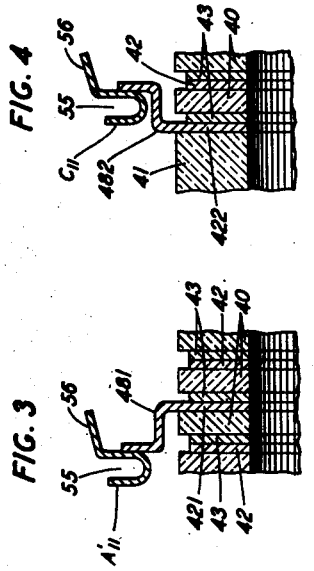
FIG. 3
FIG. 4
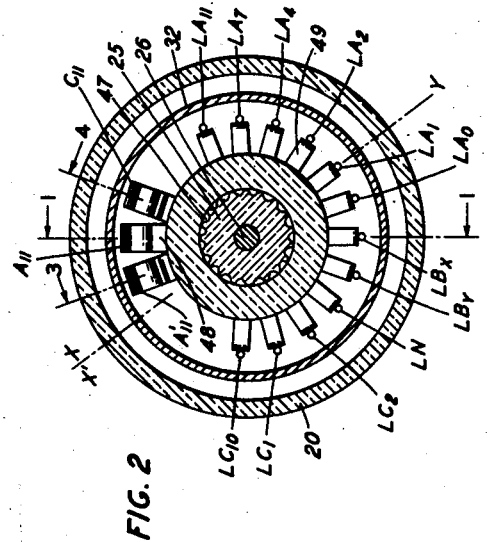
FIG. 2
INVENTOR
W. G. STIERITZ
BY
ATTORNEY March 31, 1953  W. G. STIERITZ  2,633,550
MULTICATHODE GASEOUS DISCHARGE DEVICE
Filed Feb. 3, 1951  5 Sheets-Sheet 2
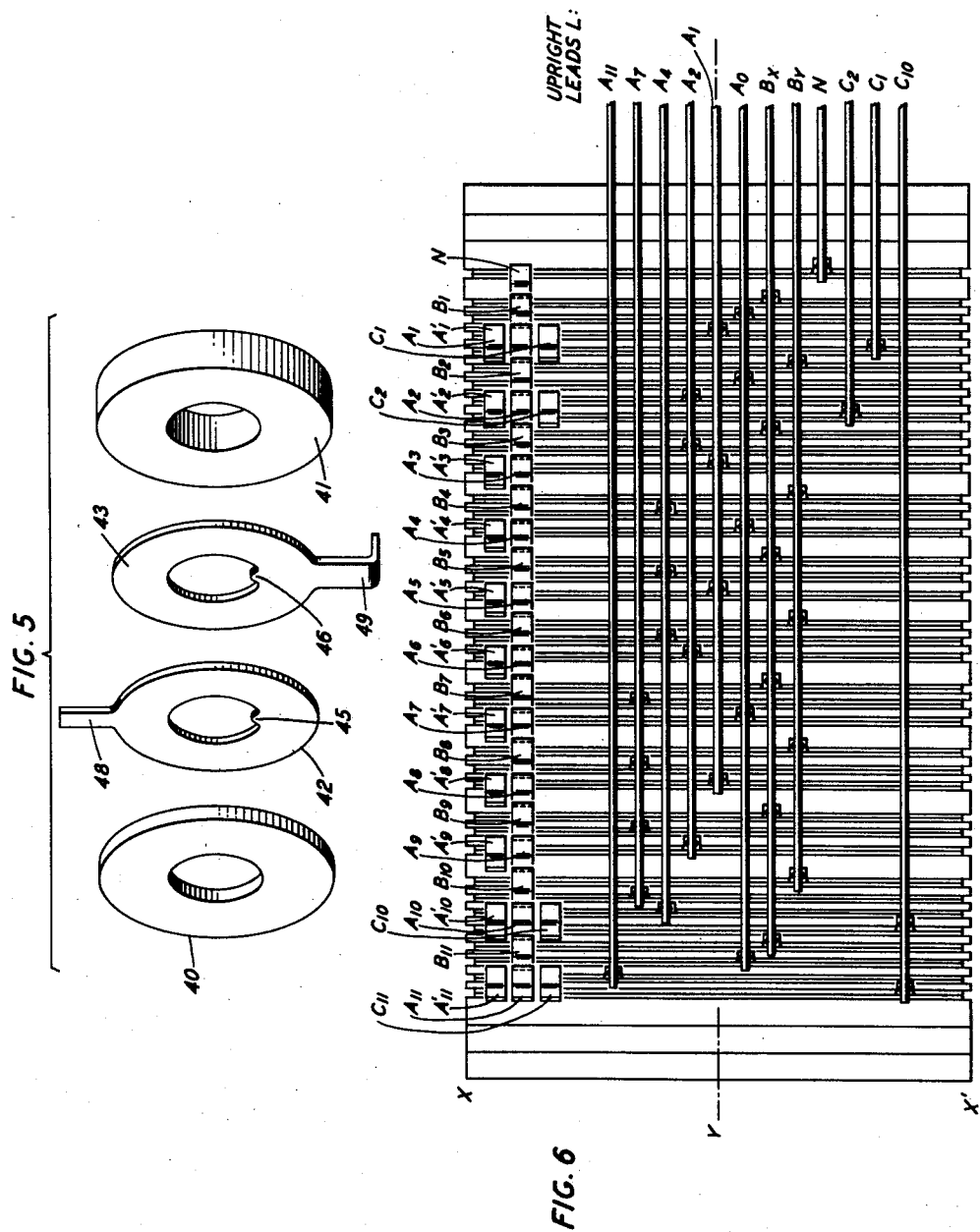
INVENTOR
W. G. STIERITZ
BY
ATTORNEY

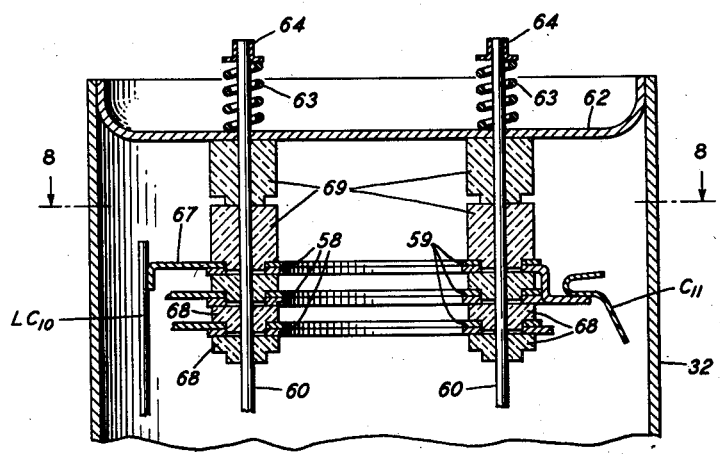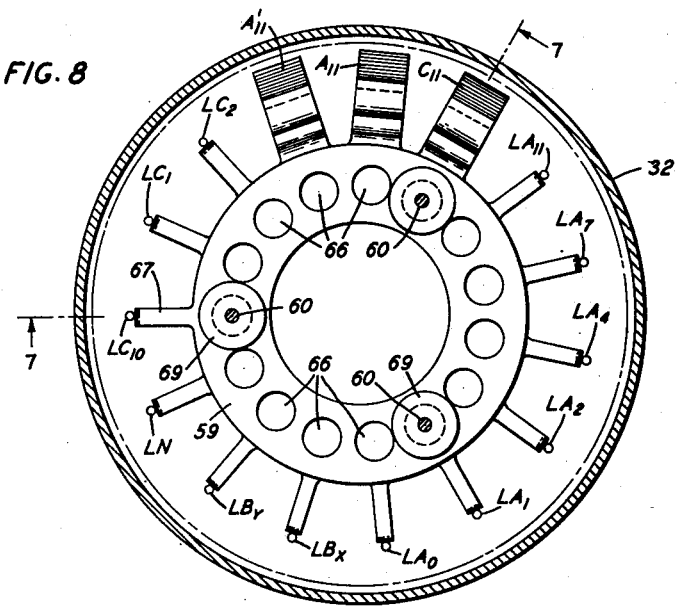

March 31, 1953 W. G. STIERITZ 2,633,550
MULTICATHODE GASEOUS DISCHARGE DEVICE
Filed Feb. 3, 1951 5 Sheets-Sheet 4

INVENTOR
W. G. STIERITZ
BY
ATTORNEY

March 31, 1953  W. G. STIERITZ  2,633,550
MULTICATHODE GASEOUS DISCHARGE DEVICE

Filed Feb. 3, 1951  5 Sheets—Sheet 5

INVENTOR
W. G. STIERITZ
BY
ATTORNEY

Patented Mar. 31, 1953

2,633,550

UNITED STATES PATENT OFFICE 2,633,550

MULTICATHODE GASEOUS DISCHARGE DEVICE

William G. Stieritz, Allentown, Pa., assignor to Bell Telephone Laboratories, Incorporated, New York, N. Y., a corporation of New York Application February 3, 1951, Serial No. 209,301

20 Claims. (Cl. 313—196)

This invention relates to gaseous discharge devices and more particularly to such devices including a multiplicity of glow cathodes.

Devices of the type to which this invention pertains comprise, in general, a plurality of cathodes in cooperative relationship to a common anode, the cathodes being so arranged and constructed that the anode-to-cathode discharge is stepped from one cathode to the next in response to signal pulses applied to the device. Typical devices in which the discharge is stepped along a row of cathodes are disclosed in Patents Nos. 2,575,370 and 2,575,371, issued November 20, 1951, to M. A. Townsend and applications Serial No. 117,316, filed September 23, 1949, of H. L. von Gugelberg, and Serial No. 133,134, filed December 15, 1949, of H. L. von Gugelberg. These devices may be employed in pulse counting operations, for example, in dial telephone systems.

In another device of this type, the discharge is stepped from an apex cathode down alternate cathodes in response to a particular sequence of two types of information or pulses. Such a device is disclosed in application Serial No. 168,227, filed June 15, 1950, of M. A. Townsend, now Patent No. 2,606,309, issued August 5, 1952. This device is a binary decoder, the information received being in a binary system and being transformed by the device to a decimal or other system.

In devices of the type above referred to, a large number of cathodes must be positioned closely adjacent each other and adjacent the common anode, be connected to lead-in wires, and be so connected in particular circuit arrangements. In application Serial No. 141,123, filed January 28, 1950, of H. L. von Gugelberg one specific structure is disclosed for a counting tube in which there are eleven counting stages, comprising eleven main cathodes, eleven transfer cathodes, alternate cathodes, and indicating cathodes, mounted by hairpin supports from a rectangularly shaped insulating support. Such a structure finds most application, however, in counting devices in which the cathodes are arranged in rows, as the block support would become large for incorporation in an evacuated device if employed to position the electrodes in the triangularly shaped configuration of the binary decoder.

One general object of this invention is to improve multiple cathode glow discharge devices.

Another object of this invention is to provide an improved structure for glow discharge devices employing a multitude of cathodes.

It is a further object of this invention to simplify the assembling of such glow discharge devices employing multiple cathodes. More specifically, objects of this invention are to reduce the number of different parts to be assembled, to facilitate their handling, and to enable efficient mass production of the devices at low costs.

These and other objects of this invention are accomplished in accordance with this invention by a stacked circular assembly of alternate conducting and insulating layers. Each of the conducting layers consists of two ring-shaped members, or portions thereof. The one member has a tab or finger extending therefrom to which a cathode is secured and the other a tab or finger extending therefrom which is secured to an upright lead. Each of the members has alignment means which mates with aligning means in the pile-up assembly so that the cathode and lead tabs are properly peripherally positioned.

By employing separate ring-shaped members for the cathodes and the lead wires any desired angular orientation of the members and thus any peripheral positioning of associated cathode and lead may be attained with piece parts that are standard for the entire device, thereby reducing the number of different parts with a concomitant reduction in cost and improved efficiency of assembling. Further, by providing alignment means associated or integral with each of the cathode support and lead connector members which mate with aligning means provided by the support structure, the desired peripheral positions for the multitudinous cathodes and leads are automatically and accurately assured.

In one specific embodiment of this invention comprising a pulse counting or stepping tube having main cathodes and transfer cathodes positioned in a single line, with alternate cathodes positioned to one side of the main cathodes and indicating cathodes positioned to the other side of certain of the main cathodes, each of the cathodes is supported by a cathode support ring with which is associated contiguous lead connector rings, the two ring members being electrically connected together so as, in effect, to comprise a single conducting member. Any of the various preference means disclosed in the above-mentioned applications may be employed to transfer the glow discharge down the row of aligned main cathodes and transfer cathodes.

Insulating rings are positioned between the conducting layers defined by the cathode support and lead connector members and in this specific embodiment of this invention the lead connector, cathode support, and insulator rings are positioned on a central splined insulator cylinder. Each of the cathode support rings and lead connector rings has an integral tab extending radially inward which defines alignment means associated with these ring members and which mates with one of the grooves in the surface of the splined central cylinder. The peripheral position of each cathode support or lead connector is thus independently determined by the alignment means associated therewith and the mating aligning means of the support structure.

In this specific embodiment, at certain stages it is desirable to have three cathodes positioned adjacent each other in a single plane, as each main cathode has to one side thereof an alternate cathode and may have to the other side thereof an indicating cathode. These cathodes are secured to fingers extending radially outward from the cathode support rings. The main cathodes, and similarly the transfer cathodes, are secured to fingers that extend out from the cathode support ring in the same plane as the ring, whereas the indicating cathodes are secured to fingers bent down from the plane of the cathode support rings and the alternate cathodes to fingers bent upward.

In another specific embodiment of this invention, the cathode support rings and lead connector rings for a pulse stepping or counting tube each have apertures evenly spaced around the ring. These apertures define alignment means associated with the ring members, the rings being dropped onto three rods of a tripod support structure, the rods being the mating aligning means of the support structure. The peripheral position or angular orientation of each cathode and each lead connnector finger extending from a lead connector ring is therefore determined by the mating of the particular apertures of the ring with the rods of the support structure. The conducting layers consisting of the electrically associated lead connector and cathode support rings are insulated from each other and from the tripod rods by insulator washers or spacers positioned on each rod between the conducting layers and having portions between each layer and the rod.

In another specific illustrative embodiment of this invention employing the tripod support structure and apertured cathode support and lead connector rings, main and transfer cathodes are positioned in a single row to an apex cathode from which main and transfer cathodes fan out in a pyramid-shaped configuration or array, which array defines a binary decoder. In this specific illustrative embodiment, the fingers integral with the lead connector rings and which connect to the leads extend radially inward from the rings into the cylindrical space within the stacked ring assembly. However, at the last or output stage lead connector rings are not employed and each cathode is directly connected to its output lead, the leads advantageously being secured to a side of the cathode. Further, as more than three cathodes are positioned in a single plane at a stage of the device, certain of the cathode support and lead connector rings are divided in segments so that the segments of a single ring may each position a separate cathode and be connected to a different lead, the segments being insulated from each other by the insulator washers at the rods of the tripod support structure.

It is therefore one feature of this invention that separate cathode support and lead connector members be positioned adjacent each other and electrically associated to form a single conducting layer for a stacked assembly of a multiple cathode glow discharge device. Further, it is a feature of this invention that the cathode support and lead connector members advantageously be rings or segments therefor. In order to position a plurality of cathodes at one stage in a single plane, the cathode support members, in accordance with this feature of this invention, have fingers extending therefrom, which fingers may be straight or bent to position the cathodes supported thereby in a plane other than that of the cathode support member itself.

It is a further feature of this invention that each of the cathode support and lead connector members have alignment means associated therewith which mate with aligning means defined by the support structure of the stacked assembly of the device. In accordance with this feature, the alignment means may be internal tabs integral with the lead connector and cathode support members which may mate with grooves on the surface of a splined central insulator cylinder. Or the alignment means may be evenly disposed apertures in the cathode support and lead connector members through which the rods of a tripod support structure extend.

It is a still further feature of this invention that the leads for the cathodes in the stacked assembly may extend external to the associated lead connector and cathode support members or internal thereto. Thus it is a feature of this invention that the cathodes may be positioned to one side of a cylindrical stacked assembly and the leads peripherally disposed at the other side thereof. Or the cathodes may be arranged around the outer periphery of a ring assembly and the leads disposed around the inner periphery thereof.

A complete understanding of the invention and the various features thereof may be gained from consideration of the following detailed description and the accompanying drawings, in which:

Fig. 1 is a sectional view of a gaseous discharge device illustrating one specific embodiment of this invention, the section being taken along the line 1—1 of Fig. 2;

Fig. 2 is a plan view taken along the line 2—2 of Fig. 1;

Fig. 3 is a partial sectional view illustrating particularly one specific cathode mounting at line 3 of Fig. 2;

Fig. 4 is a partial sectional view illustrating particularly another specific cathode mounting at line 4 of Fig. 2;

Fig. 5 is an exploded perspective view of a single layer of the stacked assembly of Fig. 1;

Fig. 6 is a developed view of the stacked assembly of the device of Fig. 1 from X through Y to X' of Fig. 2;

Fig. 7 is a partial sectional view illustrating another specific illustrative embodiment of this invention, the section being taken along the line 7—7 of Fig. 8;

Fig. 8 is a plan view taken along the line 8—8 of Fig. 7;

Figure 9:
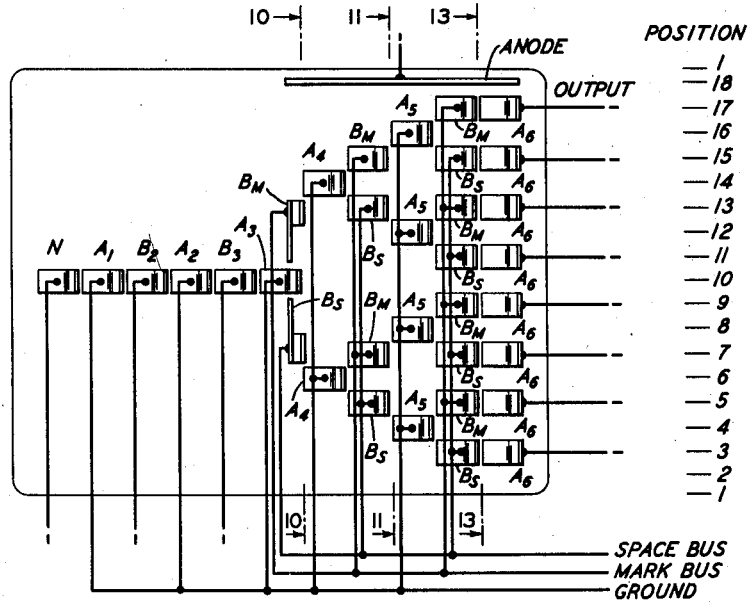
Fig. 9 is a schematic representation of a binary decoder which is mounted in accordance with another specific illustrative embodiment of this invention.

Referring now to the drawing, Fig. 1 shows a pulse stepping or counting glow discharge device illustrative of one specific embodiment of this invention and comprising a vitreous envelope 20 having an exhaust tubulation 21 centrally at one end and leads 22 sealed in the base, as by embossments 23, positioned in a circle around the tubulation 21. A splined member 25, which may advantageously be of ceramic, extends axially along the length of the bulb 20 and is supported by a central axial rod 26. An upper insulator member 27, as of mica, is secured to the top of the rod 26 by an eyelet 28 and an insulator spacer 29 is secured to the bottom of the rod 26 by an eyelet 30.

The central rod 26 in turn supports a cylindrical anode 32 which is closed at the bottom by a metallic end member 33 having holes arranged peripherally through which pass the upright leads L. The end member 33 is secured to the rod by a bushing or eyelet 34. The anode 32 is closed at the top by a metallic end member 36 held in position by a spring member 37 and bushing or eyelet 38, the spring member 37 biasing the end member 36 against the pile-up assembly positioned on the splined member 25 within the cylindrical anode 32. The anode may be provided with holes positioned so that a glow existing at one or more of the cathodes may be viewed from outside the bulb 20.

Positioned on the splined member 25 are a plurality of thin insulator rings 40, thicker insulator rings 41, cathode support rings 42 and lead connector rings 43, one such arrangement being shown in an exploded view in Fig. 5. As best seen therein each of the cathode support rings 42 has an alignment tab 45 in the inner periphery, and each of the lead connector rings an alignment tab 46. These tabs mate with axial grooves 47 in the outer surface of the splined member 25, best seen in Fig. 2, to determine the radial position of the rings 42 and 43. The cathode support ring 42 also has integral therewith an extending finger 48 to which the cathode is attached and each of the lead connector rings 43 has integral therewith an extending finger which is secured to a lead in the device.

The main cathodes A, alternate cathodes A', transfer cathodes B, and indicating cathodes C are each supported by a cathode support ring 42 and are aligned by the tabs 45 and mating grooves 47 on the splined member 25. As best seen in Fig. 6, the main cathodes A and transfer cathodes B are mounted in a single row, the alternate cathodes A' being to one side of the main cathodes A and the indicating cathodes being to the other side of those main cathodes A for which indication is desired. In order to have the indicating cathodes C and alternate cathodes A' positioned on the same plane as the main cathodes A, the alternate cathodes A' are supported by a finger 481 preferably integral with the support ring 421, the finger 481 as seen in Fig. 3 being bent upwards, the height of the bend being equal to the width of an insulator 40, a lead connector ring 43, and a support ring 42 so that the indicating cathode is at the same level as the main cathode. Similarly, the indicating cathodes C are supported by a finger 482 preferably integral with a cathode support ring 422, the finger 482 as seen in Fig. 3 being similarly bent down. Each of the cathode support rings 421 and 422 is, however, aligned by an aligning tab 45 in the above-described way.

Each of the cathodes is electrically connected through a cathode support ring 42 and the lead connector ring 43 adjacent thereto to its appropriate lead. In this particular embodiment the cathodes are positioned and lead connections made as in application Serial No. 141,123 and in accordance with Patent No. 2,575,371 whereby the main cathodes A and alternate cathodes A' are interconnected by the upright leads L so that ten counting or pulsing positions may be indicated by means of five output terminals K. Such interconnections may be referred to as a two-out-of-five lead arrangement. In this particular embodiment of the invention, ten counting stages are employed with five leads, which are designated $LA_0$, $LA_1$, $LA_2$, $LA_4$, and $LA_7$. A separate lead $LA_{11}$ is connected only to the main cathode $A_{11}$ which does not take in the normal counting operations but is employed to give information of erroneous pulsing.

The special indicating cathodes C may be secured to appropriate leads to transmit information of discharges occuring at particular stages as desired. In this particular embodiment indicating cathodes C are located adjacent the main cathodes at the first, second, tenth and eleventh stages. Indicating cathodes $C_{10}$ and $C_{11}$ are both secured to lead $LC_{10}$ but indicating cathodes $C_1$ and $C_2$ are each secured to individual leads $LC_1$ and $LC_2$, respectively.

Transfer cathodes B are positioned between the main cathodes A and are advantageously secured to two leads LB. While the B cathodes may be all secured to a single lead, difficulty is encountered in aging them evenly when all are connected together in parallel. Thus, the transfer cathodes, as shown in Fig. 6, associated with the even numbered counting stages may be connected to lead $LB_y$ and those associated with the odd numbered counting stages to lead $LB_x$. This arrangement has the further advantage of allowing for the testing of voltages necessary for transfer of the discharge in both the forward and backward directions.

As best seen in Fig. 2, these leads L extend axially around the outer circumference of the splined member 25 on the opposite side of the splined member from the cathodes. The exact radial position of each connecting ring 43 is determined by the alignment of the tab 46 in a groove 47 on the spline 25. As the cathodes and leads in accordance with this invention are secured to separate and individual rings, their positions are independent of each other and thus a particular cathode may be secured to any desired lead merely by the proper alignment of the tab 46 on the lead connector ring 43 with the spline 25.

In the pile-up of insulator rings and adjacent cathode support rings 42 and lead connector rings 43, the thin insulator rings 40 are positioned between each pair of cathode support and lead connector rings at those stages where there are three cathodes in a row between transfer cathodes B. At those stages, however, where there are no indicating cathodes C, the thicker insulator 41 is employed, its additional thickness compensating for the cathode support and lead connector rings that are not needed at that stage.

An anode lead LAn is secured to the base of the cylindrical anode 32 and each of the leads L is connected to one of the leads 22 extending through the base of the bulb 20. A getter 51 is advantageously supported by a lead LG also connected to a lead 22 and is positioned at the base of the bulb below the insulator spacer 29. The bulb is advantageously secured, as by a cement 52, to a base 53, which for this particular illustrative embodiment, may have twelve pins K.

The cathodes may each, as shown, comprise a channel-shaped portion 55 and a tail portion 56 defining a preference mechanism for the stepping of the discharge in one direction, as set forth in Patent No. 2,575,370. Other cathode shapes and preference mechanisms, as set forth in the patents and applications above referred to, may be employed in the general combination of this invention.

In one specific illustrative embodiment, the cathodes A, A', B and C are each of molybdenum, with a back coating of nickel. A molybdenum cathode having a calorized back might be employed instead. The cathode support and lead connector rings are of nickel, as are the anode 32, anode end members 33 and 36, and leads L, though other materials, such as molybdenum or tantalum could be employed. The insulators 40, 41 and splined member 25 are of a steatite ceramic, Alsimag 507, though other ceramics, such as Alsimag 35 or Alsimag 211 could be employed. The central rod 26 is also of nickel, though it could be of other materials, as molybdenum or tungsten.

In the assembling of this illustrative embodiment, the central rod 26 is placed in a holding jig and anode end member 33 slid over the rod to rest against eyelet 34. The splined member 25 is then placed on the central rod 26 and insulating members 40 and 41, cathode support rings 42 and lead connector rings 43 placed over the splined member 25. The insulator rings 40 and 41 have smooth inner peripheries which drop easily over the splined member 25 but the radial position of each cathode support ring 42 and each lead connector ring 43 is determined by the placement of the inner tabs 45 and 46 in the appropriate slot in the splined member. In this manner by the employment of separate rings for the cathodes and the leads the same parts may be used to attain any desired combination of cathode-lead positions. Advantageously the cathodes are secured, as by welding, to the fingers 48 before assembly on the splined member 25.

The anode end member 36, spring 37, and eyelet 38 are then positioned over the central rod 26 and the eyelet 38 welded or otherwise secured to the rod 26 while the spring is depressed to maintain the whole assemblage under a slight compression. The leads L are then welded to each vertical array of fingers 49 and the anode 32 then slid over the entire assembly and welded or otherwise secured to the end members 33 and 36. After removal from the holding jig the insulator spacers 27 and 29 are secured to the central rod 26, leads are secured, as by welding, to the proper stem leads 22, and the bulb and assemblage heat treated, pumped, aged and tested, as is known in the art.

In the fabrication of a device in accordance with this invention, as discussed above, it is to be noted that although the different cathodes are electrically connected to leads which are variously oriented in the device a minimum number of separate piece parts is employed and these piece parts are automatically correctly oriented and aligned during the processing. Thus all members that must be welded to a particular lead are positioned in vertical alignment by the simple operation of properly dropping the lead connector rings 43 onto the splined member 25 with the internal tab 46 mating with the appropriate groove 47.

This particular embodiment of this invention may be advantageously employed in various counting, stepping, or pulse reading operations. One such specific operation is in connection with dial telephone systems. When thus employed, each of the main cathodes A represents a digit on the dial phone, $A_1$ representing 1 and up through $A_{10}$ representing 0. Removal of the telephone instrument from its cradle will initiate a discharge between the normal cathode N and the anode 32. In response to dialing any digit, the discharge is stepped to the proper counting stage, the information being taken from the leads and forwarded by appropriate circuits to the central office equipment. The discharge is then reset to the normal cathode N for the next dialing operation.

While the internal tabs of the cathode support rings 42 and lead connector rings 43 mating with the axial grooves 47 in the splined member 25 constitute one alignment means that may be utilized in accordance with this invention, other alignment means can be employed. Thus, in the illustrative embodiment of this invention shown in Figs. 7 and 8, which is a pulse stepping device having the same array of main cathodes A, alternate cathodes A', transfer cathodes B, and indicating cathodes C and the same lead interconnections as the embodiment of Fig. 1, a different alignment means is utilized. Referring now to those figures, the cathode support rings 58 and lead connector rings 59 are positioned on a tripod structure comprising three rods 60. The rods 60, which may advantageously be of .030 diameter molybdenum wire, extend through an anode end plate 62, springs 63 positioned by eyelets 64 on the rods 60 biasing the end plate 62 towards the pile-up assemblage to maintain it under a slight compression. Each of the rings 58 and 59 has a plurality of apertures 66 therein evenly spaced around the ring. The proper radial positioning of the fingers 67 on the lead connector rings 59 and of the cathodes is obtained by the proper positioning of apertures 64 on the rods 60. Ceramic or other insulating washers 68 and 69 corresponding to the insulator rings 40 and 41 are positioned between adjacent pairs of rings 58 and 59.

This illustrative embodiment of this invention may advantageously have the same number of stages and same lead interconnections as the embodiment of Fig. 1, leads $LC_2$ and $LC_{10}$ only being shown interchanged in Fig. 8 from their positions in the embodiment of Fig. 1. However, as is readily apparent from the drawing, this illustrative embodiment may be employed in step pulsing devices employing additional stages in which embodiments additional leads L may extend within the stacked cathode support and lead connector rings, connections being made to these additional leads by suitable fingers on the lead connector rings extending radially inward.

This invention is not limited in its application to pulse counting devices. Referring now to In Figs. 9 through 13 there is represented another application of this invention for a binary decoder of the type disclosed in application Serial No. 168,227. The device is shown with a tripod support structure and alignment means of the type disclosed with reference to the embodiment of Figs. 7 and 8.

Referring now to Fig. 9, there is shown in schematic representation the cathode structure of a binary decoder, which representation may be considered to be a developed view of the device from the position 1 in succession through the other positions back to 1. The significance of these positions will become more apparent in the subsequent discussion of the structure of this embodiment. As seen in Fig. 9, the binary decoder comprises a plurality of A and B cathodes, arranged, from $A_3$ on, in a pyramid configuration. Between the apex cathode $A_3$ and the normal cathode N are interposed additional cathodes and particularly transfer cathodes $B_1$ and $B_2$. By employing these transfer cathodes and connecting them in the circuit, each to either the mark or space bus, four binary decoders of the type illustrated can be employed to give five-stage counting, so that a single output cathode can be chosen from among thirty-two $A_6$ cathodes. Thus these two transfer cathodes $B_1$ and $B_2$ allow the selection of a single device of the four devices prior to the fan counting of the binary decoder itself, as explained below.

In the operation of the binary decoder illustrated, energization of the apparatus initiates a discharge between the normal cathode N and the anode, which transfers to the first A cathode $A_1$. By means of two pulses applied successively to the transfer cathodes $B_1$ and $B_2$ the discharge is stepped from $A_1$ through $A_2$ to $A_3$, the apex cathode of the binary decoder. From the apex cathode $A_3$ two alternative paths are available, through either transfer cathode $B_M$ or $B_S$ to the next row of A cathodes $A_4$. From either of the $A_4$ cathodes two alternative paths are again available to the four $A_5$ cathodes, from each of which again two alternative paths are available to the eight $A_6$ cathodes. Each of the A cathodes, except the last row of $A_6$ cathodes is electrically connected together and may advantageously be connected to ground. Each of the $B_M$ cathodes is connected together and each of the $B_S$ cathodes is connected together. Each of the last row of cathodes, the $A_6$ cathodes, is connected to a separate lead $LA_6$.

When the discharge is at the apex cathode $A_3$ which of the two alternative paths that is chosen will depend on whether a mark impulse is received by the transfer cathode $B_M$ or a space impulse by the transfer cathode $B_S$. Similarly, the path to be taken from an $A_4$ or $A_5$ cathode will depend on whether the $B_M$ or $B_S$ transfer cathodes are energized. In this way, the discharge is guided to one of the eight output cathodes $A_6$ by a combination of three code elements which are the various combinations of mark and space pulses.

Figure 10:
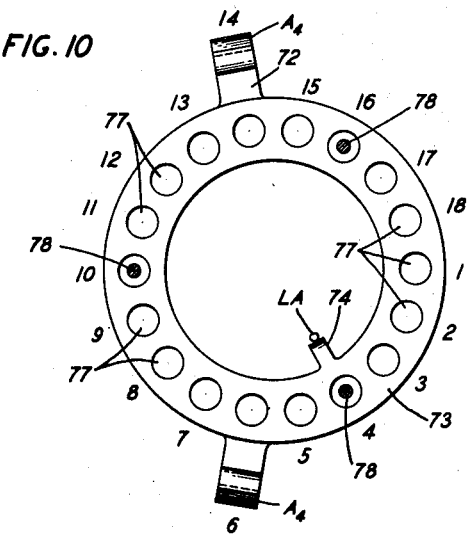
Fig. 10 is a plan view of this embodiment of this invention along the line 10—10 of the schematic Fig. 9.
Figure 11:
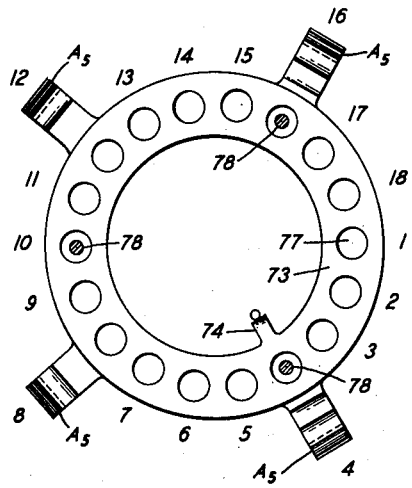
Fig. 11 is a plan view along the line 11—11 of Fig. 9.
Figure 13:
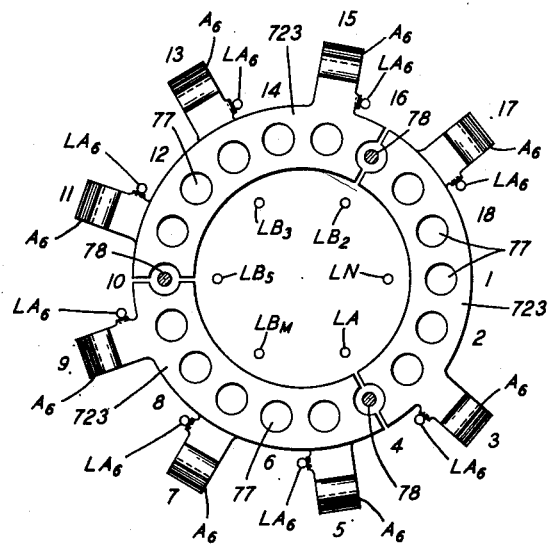
Fig. 13 is a plan view along the line 13—13 of Fig. 9.

Figs. 10, 11 and 13 are plan views of the tripod structure of a binary coder in accordance with this invention taken at the three A cathode stages of the device, i. e., at $A_4$, $A_5$ and $A_6$. In order to clarify and simplify the views, Figs. 10 and 11 show only the cathodes and leads of that particular cathode stage. Referring now to Fig. 10 the cathodes $A_4$ are supported by a cathode support ring 72 which is directly adjacent a lead connector ring 73. The lead connector ring 73 has an integral finger 74 extending radially inward and connected to a lead LA. The cathode support ring 72 has two fingers integral and extending radially outward to which the $A_4$ cathodes are connected. Each of the cathode support rings 72 and lead connector rings 73 has therein eighteen evenly spaced apertures 77. The cathode support and lead connector rings are aligned in proper angular orientation on the tripod support structure, which comprises three rods 78, by means of these apertures 77. Each adjacent pair of cathode support and lead connector rings is separated from the next pair by means of insulator washers or spacers similar to the insulators 68 of the embodiment of Figs. 7 and 8.

By the alignment means of the spaced apertures 77 and the tripod structure eighteen spaced positions are defined, these positions being shown to the right of the schematic representation of Fig. 9 and on each of Figs. 10, 11 and 13. The position of any cathode and any lead connection can be specified in terms of these eighteen positions.

Figure 12A:
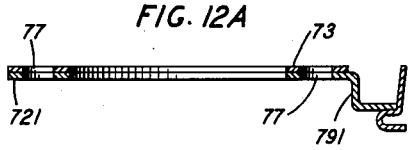
Fig. 12A is a sectional view of one cathode and lead ring employable in this embodiment of this invention.
Figure 12B:
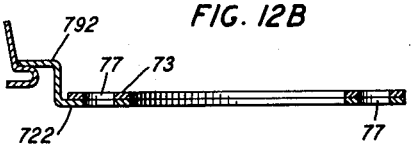
Fig. 12B is a sectional view of another cathode and lead ring employable in this embodiment of this invention.

Two or three cathodes electrically insulated from each other can be accommodated on a single cathode stage by the rings 72 and 73 by providing a cathode support ring 72 which has a straight integral finger, a cathode support ring 721 which has an integral finger 791 bent downward and/or a cathode support ring 722 having an integral finger 792 bent upward, as seen in Figs. 12A and 12B so that the cathodes are on a single plane. When cathodes not insulated from each other are to be accommodated on a single plane in a single decoding or counting stage, as shown in Fig. 11 with reference to the four $A_5$ cathodes, it is preferable to employ a cathode support ring similar to that used previously in Fig. 10 which has a plurality of integral support fingers. Thus referring now to Fig. 11, the $A_5$ cathodes at positions 4, 8, 12 and 16 may be supported by fingers integral with a single complete cathode support and adjacent lead connector ring. These cathodes could also be supported by segments of support and lead connector rings. Thus the cathodes at positions 8 and 16 could be supported by independent complete rings, the $A_5$ cathode at position 12 by a one-third segment and that at position 4 by a two-third segment, the fingers 79 being bent as shown in Figs. 12A and 12B.

At the output cathode stage each of the $A_6$ cathodes on each of three planes is supported by a one-third segment 723, the segments being insulated from each other by the insulating wafers surrounding the rods 78. Further, the separate leads $LA_6$ of each of the $A_6$ cathodes are secured directly to the cathodes around the outer periphery of the pile-up assembly, so that lead connector rings need not be employed at this stage. As these cathodes are positioned in the lowest stage, the leads $LA_6$ do not interfere with the other cathodes. These leads $LA_6$ are thus advantageously positioned outside the pile-up assembly to prevent overcrowding of the inner space. One illustrative arrangement of all the leads of the device is shown in Fig. 13, lead LA for the A cathodes being shown at position 4, lead $LB_M$ at position 7, lead $LB_S$ at position 10, lead $LB_3$ at position 13, lead $LB_2$ at position 16, and lead LN at position 1.

It is to be understood that the above-described arrangements are illustrative of the application of the principles of the invention. Other ar-

What is claimed is:

1. A gaseous discharge device comprising a plurality of first conducting members, cathode means attached to each of said first members, a plurality of second conducting members contiguous to and in electrical contact with said first members, lead means attached to said second members, insulating means between each pair of contiguous first and second members, and means mounting said first and second members and said insulating means in stacked relationship.

2. A gaseous discharge device comprising a plurality of cathode support members, cathode means attached to each of said cathode support members, a plurality of lead connector members in juxtaposition to and in electrical contact with said cathode support members, lead means attached to said lead connector members, alignment means associated with said cathode support and lead connector members for determining the orientation of said cathode support and lead connector members, insulating means between each pair of juxtaposed members, and means mounting said cathode support and lead connector members and said insulating means in stacked relationship.

3. A gaseous discharge device comprising a plurality of first flat arcuate conducting members, cathode means attached to each of said first members, a plurality of second flat arcuate conducting members, each of said second members being adjacent to and in electrical contact with one of said first members forming a single conductive layer thereby, insulating means between each of said conductive layers, means assembling said conductive layers and said insulating means in stacked relationship, a plurality of leads extending in said device adjacent said stacked conductive layers, said second members being connected to said leads, and means associated with said members for determining the relative angular orientation of said members.

4. A gaseous discharge device comprising a plurality of cathode support ring-like members, cathode means attached to each of said members, a plurality of lead connector ring-like members contiguous to and in electrical contact with said cathode support ring-like members forming a single conductive layer thereby, insulating means between each of said conductive layers, support means mounting said conductive layers and said insulating means in a stacked assembly, alignment means associated with said ring-like members, aligning means defined by said support means, said alignment means mating with said aligning means to determine the relative angular orientation of said ring-like members, and a plurality of leads extending in said device adjacent said stacked assembly, said lead connector ring-like members being selectively secured each to one of said leads.

5. A gaseous discharge device comprising a plurality of cathode support rings, fingers extending from said rings, cathodes mounted by said fingers, a plurality of lead connector rings, fingers extending from said lead connector rings, said lead connector rings being in juxtaposition to and in electrical contact with said cathode support rings and defining therewith a single conductive layer, insulating means between each of said conductive layers, a support mounting said conductive layers and said insulating means in a stacked assembly, a plurality of leads extending in said device adjacent said stacked assembly, said lead connector rings being selectively connected each to one of said leads by said fingers extending from said lead connector rings, alignment means associated with said rings, and aligning means defined by said support, said alignment means mating with said aligning means to determine the relative angular orientation of each of said fingers of said rings.

6. A gaseous discharge pulse stepping device comprising a plurality of cathode support rings, a plurality of lead connector rings in juxtaposition to and in electrical contact with said cathode support rings, insulating means between each pair of adjacent rings, support means mounting said rings and insulating means in a stacked assembly, a plurality of cathodes mounted by said support rings in a single row down said assembly, a cathode mounted to each side of certain of said plurality of cathodes by said support rings, a plurality of leads extending adjacent to said assembly removed from said cathodes, means attached to said lead connector rings securing said rings to said leads, and means associated with said rings determining the relative angular orientation of each of said cathodes and said means attached to said lead connector rings.

7. A gaseous discharge device comprising a central support member, said member having grooves extending axially in its surface, a plurality of cathode support rings and contiguous lead connector rings positioned on said support member, a plurality of cathodes supported by said support rings, a plurality of leads extending in said device axially with said central support member and secured to said connector rings, and means integral with said rings extending into said grooves to determine the relative angular orientation of each of said rings.

8. A gaseous discharge device comprising a cylindrical central support member, said member having grooves extending axially in its surface, a plurality of cathode support rings positioned on said support member, a plurality of lead connector rings positioned on said support member, each of said lead connector rings being adjacent to and in electrical contact with one of said cathode support rings, insulating rings between pairs of said rings, each of said cathode support rings having a finger extending therefrom, a cathode mounted by each of said fingers, each of said lead connector rings having a finger extending therefrom, a plurality of leads extending in said device axially with said central support member, each of said connector ring fingers being secured to one of said leads, and a tab on the inner periphery of each of said lead connector and cathode support rings fitting in a groove in said central member to determine the relative angular orientation of each of said fingers.

9. A gaseous discharge pulse stepping device comprising a central cylindrical support member, said member having grooves extending axially in its surface, a plurality of cathode support rings positioned on said support member, a plurality of lead connector rings positioned on said support members, each of said lead connector rings being adjacent to and in electrical contact with one of said cathode support rings, insulating means between pairs of said rings, each of said cathode rings having an integral finger extending radially outward therefrom, a plurality of alternate main and transfer cathodes mounted by a first group of said fingers, said first group of said fingers each extending in the plane of its ring, a plurality of alternate cathodes to one side of each of said main cathodes and a plurality of indicating cathodes to the other side of certain of said main cathodes mounted by a second group of said fingers, said second group of said fingers being bent from the plane of the rings of said second group to mount said cathodes adjacent said main cathodes, a plurality of leads extending in said device axially with said central support member, each of said connector rings having an integral finger connected to one of said leads, and a tab on the inner periphery of each of said rings fitting in a groove in said central support member determining the angular orientation of each of said integral fingers.

10. A gaseous discharge pulse stepping device comprising an envelope, a central rod located in said envelope, a cylindrical support member positioned on said rod, said support member having grooves extending axially in its surface, a plurality of cathode support rings positioned on said support member, a plurality of lead connector rings positioned on said support member contiguous to said cathode support rings, an internal tab extending from each of said rings and fitting into one of said grooves to determine the angular orientation of each of said rings, insulating means between adjacent pairs of rings, an array of cathodes supported by said support rings to one side of said central support member, a plurality of leads extending peripherally around the other side of said support member, each of said connector rings being connected to one of said leads, spring means attached to said central rod maintaining the stacked assemblage of said rings and insulating means under compression, and a substantially closed anode encompassing said stacked assemblage.

11. A gaseous discharge device comprising a plurality of rods, a plurality of cathode support rings and lead connector rings each having a plurality of evenly disposed apertures therein positioned on said rods, each of said lead connector rings being contiguous to and in electrical contact with one of said cathode support rings, insulating means between adjacent pairs of said rings, a plurality of cathodes supported by said support rings and a plurality of leads connected to said connector rings.

12. A gaseous discharge device comprising a plurality of rods, a plurality of cathode support rings and lead connector rings each having a plurality of evenly disposed apertures therein positioned on said rods, each of said lead connector rings being contiguous to and in electrical contact with one of said support rings, insulator spacers positioned on said rods between each pair of rings and insulating said rods from said rings, each of said rings having a finger extending therefrom, a plurality of cathodes mounted in an array by the fingers of said support rings, and a plurality of leads extending in said device adjacent the stacked assembly defined by said rings and insulator spacers, each of said lead connector rings being connected to one of said leads by the fingers of said lead connector rings.

13. A gaseous discharge pulse stepping device comprising a tripod support structure including a plurality of rod-like members, a plurality of cathode support rings and lead connector rings each having a plurality of apertures evenly disposed therein, said rods extending through apertures in each of said rings to mount said rings on said support structure, each of said lead connector rings being contiguous to and in electrical contact with one of said cathode support rings, insulator spacers positioned on said rods between each pair of said contiguous rings, each of said cathode support rings having a finger extending therefrom, a plurality of cathodes mounted to one side of said support structure by said fingers, each of said lead connector rings having a finger extending therefrom, a plurality of leads extending adjacent the other side of said support structure, each of said connector ring fingers being secured to one of said leads, the angular orientation of said fingers being determined by the apertures in said rings through which said rods extend, and means holding said rings and insulator spacers on said tripod structure in a stacked assemblage.

14. A gaseous discharge pulse stepping device in accordance with claim 13 wherein said cathodes comprise alternate main and transfer cathodes positioned in a single row, alternate cathodes to one side of each of said main cathodes, and indicating cathodes to the other side of certain of said main cathodes, and the supporting ring fingers mounting said alternate and indicating cathodes are bent from the plane of their rings to position said alternate and indicating cathodes adjacent said main cathodes.

15. A gaseous discharge device comprising a plurality of rods, a plurality of cathode support rings and lead connector rings each having a plurality of apertures evenly disposed therein, said rods extending through said apertures in each of said rings, the angular orientation of each ring being determined by the apertures through which said rods extend, each of said lead connector rings being adjacent one of said cathode support rings and in electrical contact therewith, insulating means between each pair of rings, means holding said rings and insulator means in a stacked assemblage on said rods, an array of cathodes on the outside of said assemblage, each of said cathodes being supported by one of said support rings, and a plurality of leads extending inside of said stacked assemblage, each of said connector rings being secured to one of said leads.

16. A gaseous discharge device in accordance with claim 15 wherein certain of said rings comprise segments insulated from each other, each of said cathode supporting ring segments supporting one of said cathodes.

17. A gaseous discharge binary decoder device comprising a tripod support structure including a plurality of rod-like members, a plurality of cathode support rings and lead connector rings each having a plurality of apertures evenly disposed therein, said rods extending through apertures in each of said rings to mount said rings on said support structure, each of said lead connector rings being contiguous to and in electrical contact with one of said cathode support rings, insulator spacers positioned on said rods between each pair of said contiguous rings, each of said cathode support rings having a finger extending outward therefrom, a cathode mounted by each of said fingers, said cathodes being arranged in a binary decoder array, and a plurality of leads extending within said rings, each of said connector rings having a finger extending inwardly therefrom secured to one of said leads, the angular orientations of all of said fingers being determined by the apertures in said rings through which said rods extend.

18. A gaseous discharge binary decoder device in accordance with claim 17 wherein certain of said cathode support ring fingers extend out from said ring in the plane of their rings, certain of said fingers are bent upward from the plane of their rings, and certain of said fingers are bent downward from the plane of their rings to position each of said cathodes at a single stage of counting at the same place.

19. A gaseous discharge binary decoder device in accordance with claim 18 wherein certain of said rings comprise segments insulated from each, each of said cathode supporting ring segments supporting one of said cathodes.

20. A gaseous discharge binary decoder in accordance with claim 19 wherein each of the output cathodes at the last stage of counting has directly secured thereto an output lead.

WILLIAM G. STIERITZ.

No references cited.